United States Patent [19]

Waaben

[11] 3,849,675

[45] Nov. 19, 1974

[54] LOW POWER FLIP-FLOP CIRCUITS

[75] Inventor: Sigurd Gunther Waaben, Princeton, N.J.

[73] Assignee: Bell Telephone Laboratories, Incorporated, Murray Hill, N.J.

[22] Filed: Jan. 3, 1974

[21] Appl. No.: 430,383

Related U.S. Application Data

[63] Continuation-in-part of Ser. No. 321,364, Jan. 5, 1973, abandoned.

[52] U.S. Cl. ............. 307/292, 307/238, 307/317 A, 340/173 FF

[51] Int. Cl. ....................... H03k 3/286, G11c 11/34

[58] Field of Search ........... 307/238, 281, 289, 290, 307/291, 292, 279, 300, 317 R, 317 A; 340/173 FF

[56] References Cited

UNITED STATES PATENTS

| | | | |
|---|---|---|---|
| 3,463,975 | 8/1969 | Biard | 307/317 X |
| 3,537,078 | 10/1970 | Pomeranz | 307/238 X |
| 3,540,010 | 11/1970 | Heightley et al. | 307/292 X |
| 3,564,300 | 2/1971 | Henle | 307/292 X |
| 3,573,758 | 4/1971 | Henle et al. | 307/238 X |
| 3,643,230 | 2/1972 | Lynes | 307/292 X |
| 3,703,709 | 11/1972 | Matsue | 307/238 X |
| 3,742,368 | 6/1973 | Gelabert | 307/293 X |

OTHER PUBLICATIONS

Lane, "Integrated Schottky Barrier Diode Cell," IBM Tech. Discl. Bull., Vol. 14, No. 6, p. 1686, 11/1971.

Klepp, "Regenerative Controlled Decay Storage Cell," IBM Tech. Discl. Bull., Vol. 14, No. 1, p. 270, 6/1971.

Moore, "Schottky Barrier Diode Storage Cell," IBM Tech. Discl. Bull., Vol. 14, No. 6, p. 1683, 11/1971.

Tertel, "Sense Scheme For a Multiemitter Cell," IBM Tech. Discl. Bull., Vol. 14, No. 6, pp. 1680–1681, 11/1971.

Bodendorf, "Polarity-Hold Circuit with True and Complement Output," IBM Tech. Discl. Bull., Vol. 14, No. 2, p. 416, 7/1971.

Ayling, "Monolithic Storage Cell," IBM Tech. Discl. Bull., Vol. 14, No. 6, pp. 1660–1661, 11/1971.

"Why Schottky TTL Won", Electronics (pub.), p. 65, 10/11/1971.

*Primary Examiner*—Rudolph V. Rolinec
*Assistant Examiner*—L. N. Anagnos
*Attorney, Agent, or Firm*—I. Ostroff

[57] ABSTRACT

The series combination of a pair of diodes, preferably Schottky barrier diodes, are substituted for the load resistors of a standard two-transistor flip-flop. The base of each of the transistors is cross-coupled to the cathode of one diode which is connected to the collector of the other transistor through a Schottky barrier diode. Low power dissipation is achieved because the power supply need be of only sufficient magnitude to forward bias two semiconductor junctions.

7 Claims, 4 Drawing Figures

LOW POWER FLIP-FLOP CIRCUITS

CROSS REFERENCE TO RELATED APPLICATION

This application is a continuation-in-part of my co-pending application Ser. No. 321,364 filed on Jan. 5, 1973, now abaondoned.

BACKGROUND OF THE INVENTION

This invention relates to semiconductor digital storage circuits and, more particularly, to low power multivibrator circuits of a type known as flip-flop circuits.

In order to lower the power dissipation of standard flip-flop circuits, which comprise two transistors with the base of each being coupled to the collector of the other and a load resistor being connected to each of the collectors, it is necessary to increase the value of the load resistors. One serious drawback of this approach is that integrated circuit fabrication technology limits the practical size of a resistor to a few thousand ohms. Due to the relationship between the resistivity of the semi-conductor material and the area and length of the resistor, any increase beyond this requires resistors which are excessively long and narrow.

Another disadvantage of a large load resistance is that it reduces switching speed.

U.S. Pat. No. 3,573,758 teaches the reduction of power dissipation in the flip-flop cell by substituting two diodes for the load resistor. This approach has many desirable characteristics; however, power dissipation may be relatively high since the magnitude of the power supply must be sufficient to forward bias three serially connected semiconductor junctions.

OBJECTS OF THE INVENTION

It is an object of this invention to provide a flip-flop storage cell which operates with relatively low power dissipation.

It is a further object of this invention to provide a flip-flop storage cell which is capable of relatively high switching speeds.

SUMMARY OF THE INVENTION

These and other objects, features and advantages of the invention are attained in an illustrative embodiment comprising first and second transistors and first, second, third and fourth diodes. In the preferred embodiment, each of the diodes is a Schottky barrier diode, although two of the diodes may be ordinary p-n junction diodes.

In one embodiment of the invention the cathodes of the first and second diodes are coupled to the anodes of the third and fourth diodes, respectively, and the cathodes of the third and fourth diodes are coupled to the collectors of the first and second transistors, respectively. The anodes of the first and second diodes are coupled to a fixed first voltage source and the emitters are coupled to a fixed second voltage source. Externally supplied voltage pulses applied to the bases of the transistors cause conduction to switch from one transistor to the other.

In another embodiment a voltage pulse circuit is substituted for the fixed first voltage source in order to decrease response time. In addition, dual emitter transistors are used such that write-in can be accomplished by applying the proper potentials to the second set of emitters.

In still another embodiment the cathodes of the first and second diodes are coupled directly to the collectors of the first and second transistors, respectively. The third diode is coupled between the base and collector of the first transistor and the fourth diode is coupled between the base and collector of the fourth transistor. This allows for a physically smaller cell than the above-described cells.

In each of the above-described embodiments the power supply need be of only sufficient magnitude to forward bias two semiconductor junctions, and thus power dissipation is inherently reduced. Due to the relatively low power dissipation, fast response time, and circuit simplicity, these storage cells may be easily used as component memory cells in relatively large capacity memory arrays.

In order to maintain a good degree of design flexibility it is desirable that the barrier heights of the third and fourth diodes be less than that of the emitter base junction of each of the transistors. Schottky barrier diodes are a preferred example of a diode that meets this criterion. The first and second diodes are also preferably Schottky barrier diodes. It is advantageous to utilize diodes having a low barrier height since the magnitude of the voltage of the power supply utilized can be reduced and thus power dissipation is lowered.

These and other objects, features and advantages of the invention will be better understood from a considation of the following detailed description, taken in conjunction with the accompanying drawing.

BRIEF DESCRIPTION OF THE DRAWING

Each of FIGS. 1, 2, 3 and 4 illustrates a circuit schematic of a storage cell in accordance with a different embodiment of the invention.

DETAILED DESCRIPTION

Figure 1:
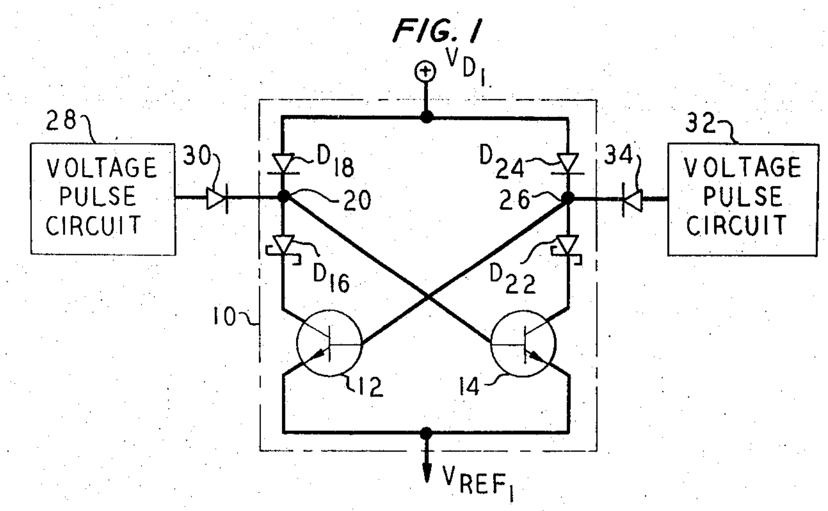

Referring now to FIG. 1 there is illustrated a flip-flop storage cell 10 which includes a pair of NPN transistors 12 and 14. The collector of transistor 12 is coupled to the cathode of Schottky barrier diode $D_{16}$. The anode of $D_{16}$ is connected at a circuit node 20 to the cathode of p-n diode $D_{18}$. The collector of transistor 14 is connected to the cathode of Schottky barrier diode $D_{22}$. The anode of $D_{22}$ is connected at a circuit node 26 to the cathode of p-n diode $D_{24}$. The base of transistor 12 is coupled to node 26 and the base of transistor 14 is coupled to node 20. The anodes of $D_{18}$ and $D_{24}$ are coupled to potential $+V_{D_1}$. The emitters of transistors 12 and 14 are coupled to potential $V_{ref_1}$.

As is the case of the standard flip-flop, which contains load resistors instead of diodes, only one of the two transistors conducts at a time in steady-state operation. For example, if transistor 14 is conducting, then transistor 12 is nonconducting. This condition is stable since the potential of node 26 is less positive than the potential of node 20 and, therefore, the potential of the base of transistor 12 is less positive than the potential of the base of transistor 14. This condition maintains conduction in transistor 14 and nonconduction in transistor 12.

One way to cause a current flowing through transistor 14 to switch to transistor 12 or vice versa, is to set the potential of node 20 or 26 to a positive level of approximately $+V_{D_1}$. Voltage pulse circuit 28 is coupled to node 20 through diode 30. Voltage pulse circuit 32 is coupled to node 26 through diode 34. Normally, except during the writing of information into the flip-flop, voltage pulse circuits 28 and 32 are held in a low state which is typically ground potential. In order to cause transistor 12 to conduct, voltage pulse circuit 32 supplies a positive voltage pulse to node 26 while voltage pulse circuit 28 is maintained at ground potential. This causes the potential of the base of transistor 12 to be more positive than that of transistor 14, thereby diverting conduction through transistor 14 to transistor 12.

The path in which conduction flows is indicative of whether the flip-flop stores a "1" or a "0." Many ways exist to determine which transistor is conducting. One of the simpler ways is to merely monitor the potential of node 20 or 26. If conduction exists in $D_{24}$, $D_{22}$ and transistor 14, the potential of node 26 is lower than if the conduction occurs through $D_{16}$, $D_{18}$ and transistor 12. Likewise, the potential of node 20 is lower if conduction occurs through $D_{16}$, $D_{18}$ and transistor 12 than if it doesn't.

Typically $+V_{D_1}$ is 0.87 volts. The current flowing through the conducting transistor is typically 23 microamps and the current flowing in the p-n diode coupled to the nonconducting transistor is typically 4 microamps. This results in 27 microwatts of power dissipation. The potential of nodes 20 and 26 varies from +0.488 volts to +0.408 volts depending on which transistor is conducting. If transistor 14 conducts the potential of node 20 is +0.488 volts and that of node 26 is +0.408 volts. This makes the potential of the base of transistor 14 0.08 volts more positive than the base of transistor 12. Thus transistor 14 is maintained in the conducting state and transistor 12 is maintained in the nonconducting state. Typically the amplitude of the voltage pulses supplied by voltage pulse circuits 28 and 32 is +1 volt.

The response time of the circuit is a function of the current flowing through the on-transistor and the load capacitance to be driven. The response time, $\Delta t$, can be determined from the equation:

$$i = C\Delta V/\Delta t \quad (1)$$

$$\Delta t = C\Delta V/i \quad (2)$$

where $i$ is the current flowing in transistor 12 or 14 when either is on, $\Delta V$ is the change in potential of node 20 or 26, and $C$ is capacitance associated with node 20 or 26 plus any load capacitance (not illustrated) coupled to either node. For $i = 27$ microamps, $C = 2 \times 10^{-12}$F, and $\Delta V = 0.08$ volts, $\Delta t \cong 6 \times 10^{-9}$ seconds.

To maintain a good degree of design flexibility it is desirable that the barrier heights of $D_{16}$ and $D_{22}$ be less than the emitter-base junctions of transistors 12 and 14. In addition, the magnitude of the supply voltage can be further reduced by replacing p-n diodes $D_{18}$ and $D_{24}$ with Schottky barrier diodes or other types of diodes which have a low barrier height. As is used herein, the term "barrier height" is that characteristic of a diode which determines how much voltage needs to be applied to a diode to achieve a predetermined current level therethrough. The barrier height of a diode can be controlled by a variety of known techniques, including varying the physical size of the diode.

In order to keep power dissipation low and maintain design flexibility in the preferred embodiment diodes $D_{16}$, $D_{18}$, $D_{22}$ and $D_{24}$ are Schottky barrier diodes. A Schottky barrier diode has a lower barrier height than a p-n diode and consequently has a smaller forward bias voltage drop for a given value of forward conduction than a p-n diode. This means that the value of the supply voltage $+V_{D_1}$ can be lower if $D_{16}$ and $D_{22}$ are Schottky barrier diodes than if they are p-n diodes. Considerable design flexibility is lost if $D_{16}$ and $D_{22}$ are p-n diodes because it is difficult to establish a supply voltage $+V_{D_1}$ which results in a selected current flow through $D_{24}$, $D_{22}$ and transistor 14 (assuming transistor 14 is on) and results in the proper current flow through $D_{18}$ into the emitter-base junction of transistor 14.

Figure 2:
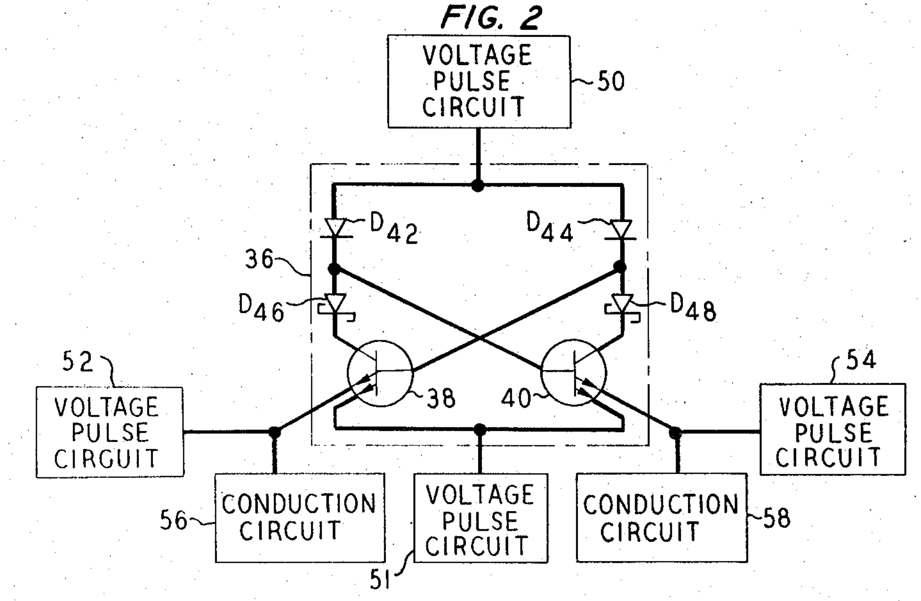

Referring now to FIG. 2, there is illustrated another embodiment of the invention comprising a flip-flop storage cell 36. The cell 36 comprises NPN transistors 38 and 40, p-n diodes $D_{42}$ and $D_{44}$ and Schottky barrier diodes $D_{46}$ and $D_{48}$. The anodes of $D_{42}$ and $D_{44}$ are coupled to voltage pulse circuit 50. The cathodes of $D_{42}$ and $D_{44}$ are coupled to the anodes of $D_{46}$ and $D_{48}$, respectively. The cathode of $D_{42}$ is coupled to the base of transistor 40 and the cathode of $D_{44}$ is coupled to the base of transistor 38. Transistors 38 and 40 are both dual emitter transistors. One of the emitters of each transistor is coupled to voltage pulse circuit 51. The other emitters are coupled to voltage pulse circuits 52 and 54, respectively, and to conduction detectors 56 and 58, respectively.

During the time information is stored in the flip-flop cell 36, the output voltage of voltage pulse circuit 50 is held at a first positive potential $V_1$, and the output of voltage pulse circuit 51 is held at a reference potential, which is typically ground potential. The outputs of voltage pulse circuits 52 and 54 are also $V_1$. Conduction occurring through transistor 38 or 40 flows into voltage pulse circuit 51 since the emitters coupled to voltage pulse circuit 51 are held at a more negative potential and the emitters coupled to voltage pulse circuits 52 and 54.

In order to read out information stored in cell 36 (i.e., to determine whether the conduction is through transistor 38 or 40), voltage pulse circuit 50 is pulsed from $V_1$ to $V_2$, where $|V_2| > |V_1|$, and the output of voltage pulse circuit 51 is pulsed to a positive potential. Concurrently voltage pulse circuits 52 and 54 are pulsed to ground potential. This combination of potentials causes current flow through transistor 38 or 40 to be diverted from voltage pulse circuit 51 into conduction detector 56 or 58.

In order to write information into cell 36 (i.e., to switch current flow from one transistor to the other) the output of voltage pulse circuit 51 is pulsed to a positive potential while voltage pulse circuit 52 or 54 is pulsed from a positive potential to a negative potential. This causes conduction to switch to the transistor having the emitter which has been lowered to the negative potential. The output of voltage pulse circuit 51 is now returned to ground potential and the output of voltage pulse circuit 52 or 54 that was pulsed negative is returned to a positive potential. This combination of potentials causes the conduction through transistor 38 or 40 to again flow into voltage pulse circuit 51. Voltage pulse circuit 50 can be pulsed to the $V_2$ potential during the write operation in order to lower the time required for the operation.

The ability to write information into cell 36 via the second set of emitters allows this cell to be relatively easily used as a component in relatively large capacity memory arrays. This cell, when used as a component in a memory array, requires less complex control circuitry than the cell of FIG. 1.

The prior discussion concerning the substitution of diodes of a lesser barrier height for $D_{18}$ and $D_{24}$ of FIG. 1 is equally applicable for $D_{42}$ and $D_{44}$ of FIG. 2. Likewise, $D_{46}$ and $D_{48}$ may be diodes with as low a barrier height as is available.

Figure 3:
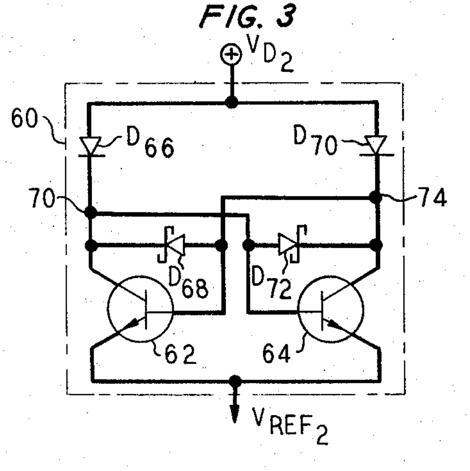

Referring now to FIG. 3, there is illustrated a flip-flop storage cell 60 which includes a pair of NPN transistors 62 and 64. The cathodes of p-n diode $D_{66}$ and Schottky barrier diode $D_{68}$ are both coupled to the collector of transistor 62. The common circuit node is to be denoted as node 70. The cathodes of p-n diode $D_{70}$ and Schottky barrier diode $D_{72}$ are both coupled to the collector of transistor 64, the common node being denoted as node 74. The anode of $D_{66}$ and $D_{70}$ are both coupled to potential $+V_{D_2}$. The emitters of transistors 62 and 64 are coupled to $V_{ref_2}$.

In this memory cell, as in the cells of FIGS. 1 and 2, only one of the two transistors conducts at a time during steady-state operation. If transistor 62 is conducting, there is substantially more conduction through $D_{66}$ than $D_{70}$ and, therefore, the potential of the cathode of $D_{66}$ is less positive than of the potential of cathode $D_{70}$. This means that the potential of the base of transistor 64 is less positive than the potential of the base of transistor 62, and therefore that transistor 62 is on and transistor 64 is off.

When transistor 62 is on, $D_{70}$ and $D_{68}$ are conducting in the forward direction. This causes the potential of the collector of transistor 62 to be two junction drops below $+V_{D_2}$ (i.e., the junctions being $D_{68}$ and $D_{70}$). The voltage drop across $D_{66}$ is, of course, equal to that across $D_{68}$ and $D_{70}$. This means that the conduction through $D_{66}$ is greater than through $D_{68}$ and $D_{70}$.

Information may be written into this flip-flop by coupling the same type of write circuitry illustrated in FIG. 1 to nodes 70 and 74. The application of a positive voltage pulse to node 70 or 74 causes conduction to shift to either of the two transistors (62, 64).

Readout is easily accomplished by monitoring the potential of node 70 or 74.

One advantage of this embodiment is that the Schottky barrier diodes can be easily fabricated, using standard monolithic integrated circuit techniques as part of the transistors by simply establishing a metal path between the p-type base region and the n-type collector region. The metal connection to the collector forms the Schottky barrier diode. This configuration leads to a memory cell having a smaller area than the cell of FIG. 1.

The prior discussion concerning the substitution of diodes of a lesser barrier height is equally applicable for $D_{66}$ and $D_{70}$ and $D_{68}$ and $D_{72}$ of FIG. 3.

Figure 4:
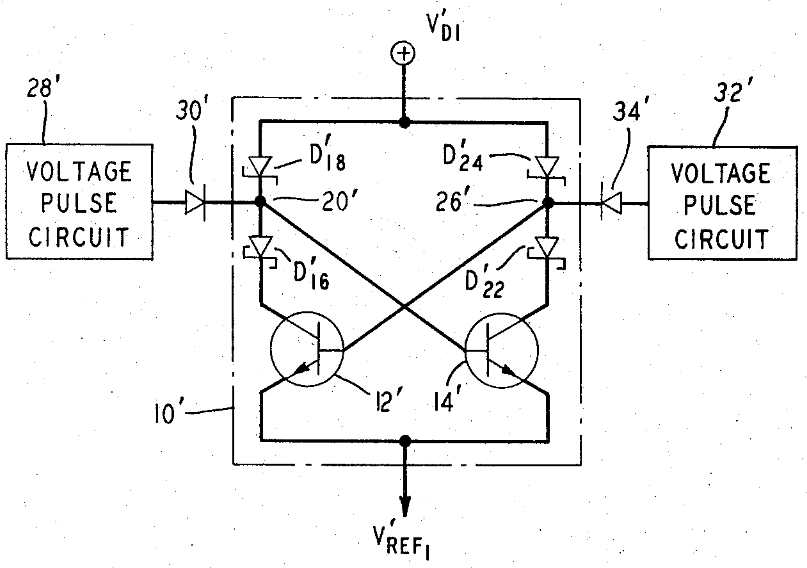

Referring now to FIG. 4, there is illustrated a flip-flop cell 10' which comprises the same essential components as the flip-flop storage cell of FIG. 1 except that diodes $D'_{18}$ and $D'_{24}$ are Schottky barrier diodes and not p-n diodes as are corresponding diodes $D_{18}$ and $D_{24}$. Flip-flop cell 10' operates in substantially the same manner as flip-flop cell 10 of FIG. 1.

It is to be understood that the embodiments described are merely illustrative of the general principles of the invention. Various modifications are possible within the spirit of the invention. For example, PNP transistors may be substituted for the NPN transistor providing the diodes and the relevant voltages are reversed. Still further, voltage pulse circuit 51 of FIG. 2 can be replaced by a resistor. Typically, a plurality of the described cells will be coupled together to form a semiconductor memory array. A variety of techniques including those taught in U.S. Pat. No. 3,573,758 are available for this purpose.

What is claimed is:

1. In combination:

first and second junction transistors, each of said transistors having a collector, a base, at least one emitter and an emitter-base junction;

first and second diodes, each having essentially the same barrier height;

third and fourth diodes each having essentially the same barrier height;

the barrier height of the third and fourth diodes being less than the barrier height of the emitter-base junctions of the transistors;

one emitter of each of the first and second transistors being coupled together;

the cathode of the first diode being coupled to the anode of the third diode and the cathode of the third diode being coupled to the collector of the first transistor;

the cathode of the second diode being coupled to the anode of the fourth diode and the cathode of the fourth diode being coupled to the collector of the second transistor; and the base of the first transistor being coupled to the cathode of the second diode and the base of the second transistor being coupled to the cathode of the first diode.

2. The combination of claim 1 wherein:

the first, second, third and fourth diodes are all Schottky barrier diodes.

3. In combination:

first and second junction transistors, each of said transistors having a collector, a base and at least one emitter;

first and second diodes each having the same barrier height;

third and fourth diodes each having the same barrier height, the barrier height of the first and second diodes being greater than the barrier height of the third and fourth diodes;

one emitter of each of the first and second transistors being coupled together;

the cathode of the first diode being coupled to the anode of the third diode and the cathode of the third diode being coupled to the collector of the first transistor;

the cathode of the second diode being coupled to the anode of the fourth diode and the cathode of the fourth diode being coupled to the collector of the second transistor; and the base of the first transistor being coupled to the cathode of the second diode and the base of the second transistor being coupled to the cathode of the first diode.

4. The combination of claim 3 wherein:

the first and second transistors are NPN-type transistors;

the first and second diodes are p-n diodes; and the third and fourth diodes are Schottky barrier diodes.

5. The combination of claim 4 wherein the anodes of the first and second diodes are coupled together.

6. The combination of claim 5 wherein the transistors each have two emitters.

7. In combination:

at least one set of the following:

first and second transistors, each of the first and second transistors comprises a control terminal, a first terminal and second terminal;

first and second diodes each having the same barrier height;

third and fourth diodes each having the same barrier height;

the barrier height of the first and second diodes being greater than the barrier height of the third and fourth diodes;

the cathode of the first diode being coupled to the anode of the third diode and the cathode of the third diode being coupled to the first terminal of the first transistor;

the cathode of the second diode being coupled to the anode of the fourth diode and the cathode of the fourth diode being coupled to the first terminal of the second transistor;

the second terminals of the first and second transistors being coupled together; and the control terminal of the first transistor being coupled to the cathode of the second diode and the control terminal of the second transistor being coupled to the cathode of the first diode.

* * * * *